US010355962B2

(12) United States Patent
Chandrashekar et al.

(10) Patent No.: US 10,355,962 B2
(45) Date of Patent: Jul. 16, 2019

(54) NETWORK TOPOLOGY GENERATION USING TRACEROUTE DATA

(71) Applicant: Riverbed Technology, Inc., San Francisco, CA (US)

(72) Inventors: Karthikeyan Chandrashekar, Bethesda, MD (US); Majid Raissi-Dehkordi, Potomac, MD (US); Walt Whimpenny, Ashburn, VA (US); Paul Janes, Bethesda, MD (US)

(73) Assignee: Riverbed Technology, Inc., San Francisco, CA (US)

( * ) Notice: Subject to any disclaimer, the term of this patent is extended or adjusted under 35 U.S.C. 154(b) by 819 days.

(21) Appl. No.: 14/176,644

(22) Filed: Feb. 10, 2014

(65) Prior Publication Data
US 2014/0229612 A1    Aug. 14, 2014

Related U.S. Application Data

(60) Provisional application No. 61/763,165, filed on Feb. 11, 2013.

(51) Int. Cl.
*G06F 15/173* (2006.01)
*H04L 12/26* (2006.01)
*H04L 12/24* (2006.01)
*H04L 29/12* (2006.01)

(52) U.S. Cl.
CPC .............. *H04L 43/10* (2013.01); *H04L 41/12* (2013.01); *H04L 43/0811* (2013.01); *H04L 61/103* (2013.01); *H04L 61/1511* (2013.01)

(58) Field of Classification Search
None
See application file for complete search history.

(56) References Cited

U.S. PATENT DOCUMENTS

| | | | |
|---|---|---|---|
| 8,224,931 B1 * | 7/2012 | Brandwine | H04L 41/5051 370/255 |
| 8,774,181 B1 * | 7/2014 | Zhang | H04L 12/1886 370/390 |
| 8,804,552 B2 * | 8/2014 | Olsson | 370/241.1 |
| 9,344,320 B1 * | 5/2016 | Volkman | H04L 29/06 |
| 2002/0062388 A1 * | 5/2002 | Ogier | H04L 45/26 709/238 |
| 2004/0252694 A1 * | 12/2004 | Adhikari | H04L 41/12 370/395.2 |
| 2009/0122697 A1 * | 5/2009 | Madhyasha | H04L 12/2697 370/229 |
| 2009/0290513 A1 * | 11/2009 | Swan | H04L 41/0213 370/255 |

(Continued)

*Primary Examiner* — Hamza N Algibhah
*Assistant Examiner* — Anthony T Rotolo
(74) *Attorney, Agent, or Firm* — Park, Vaughan, Fleming & Dowler LLP; Laxman Sahasrabuddhe

(57) ABSTRACT

Embodiments provide systems, methods, and computer program products for inferring node and link information from traceroute data in order to generate topology information. A system receives traceroute data for a data packet that traverses a path from a source to a destination. The system infers port types for the addresses in the traceroute data and groups subsets of the addresses in the traceroute data into logical nodes based on neighbor relationships demonstrated in backward and forward neighbors sets. The system then generates node and link information based on the inferred and grouped information.

19 Claims, 13 Drawing Sheets

(56) References Cited

U.S. PATENT DOCUMENTS

2013/0148547 A1\* 6/2013 Page ...................... H04L 67/12
370/255
2013/0268652 A1\* 10/2013 Hugard, IV .......... H04W 4/006
709/224

\* cited by examiner

NETWORK TOPOLOGY GENERATION USING TRACEROUTE DATA

CROSS-REFERENCE TO RELATED APPLICATIONS

The present application claims the benefit of U.S. Provisional Patent Application No. 61/763,165, filed on Feb. 11, 2013, which is incorporated herein by reference in its entirety.

TECHNICAL FIELD

The present disclosure relates generally to inferring node and link information from traceroute data in order to generate topology information.

BACKGROUND

Background Art

Model-based analysis (e.g. failure analysis, utilization analysis, capacity analysis, reachability analysis, etc.) requires generation of an effective topology model. Detailed device configuration information is useful to create a detailed picture of the network environment, but such detailed configuration information is typically not available to the network administrator for all nodes and links that a packet traverses. In these situations, the network administrator is still able to collect traceroute data from the packet as it traverses a path. The traceroute data lists the intermediate devices/nodes that the packet traverses to its destination.

Traceroute data does not provide all of the data necessary to generate an effective topology model. For example, traceroute data does not expressly indicate which internet protocol (IP) addresses are associated with the same node, how nodes are linked together, and sometimes fails to provide IP addresses for every hop along the packet's path.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

Example Network Environment

Figure 1:
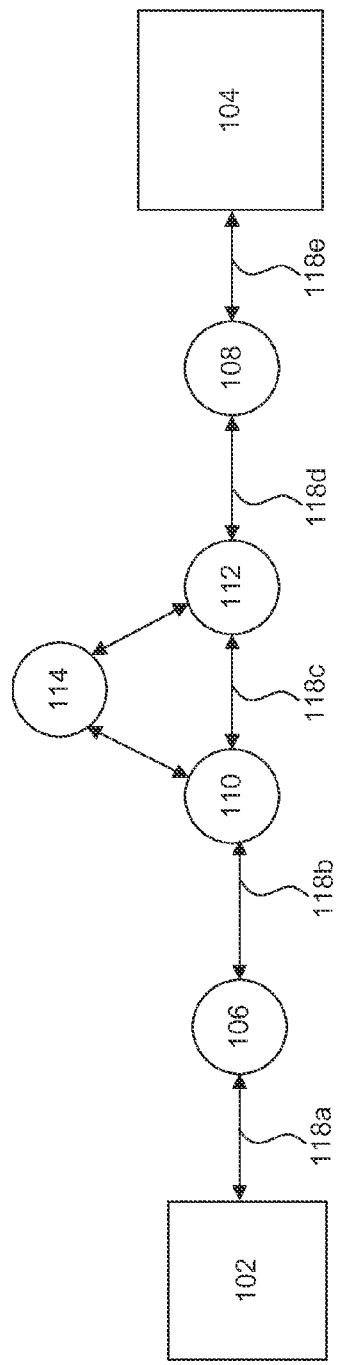
FIG. 1 illustrates an exemplary network environment according to an embodiment.

FIG. 1 illustrates an example network environment 100 according to an embodiment of the present disclosure. Example network environment 100 is provided for the purpose of illustration and is not limiting of embodiments of the present disclosure. As shown in FIG. 1, example network environment 100 includes computing devices 102 and 104, and a plurality of network nodes 106, 108, 110, 112, and 114. For the purpose of this disclosure, the term "node" is used to refer to layer 3 devices such as Layer-3 (L-3) routers or switches. In some embodiments, "node" may also refer to other types of network elements including switches, bridges, terminals, hosts, etc. As would be understood by a person skilled in the relevant art(s) based on the teachings herein, example network environment 100 may include more or fewer network nodes and/or elements than shown in FIG. 1.

As will be discussed in more detail with respect to the various embodiments and figures below, embodiments of the present disclosure enable the generation of detailed topology models based on limited input data, such as traceroute data. For the purpose of this disclosure, the term "traceroute data" is used to refer to data that indicates the path a data packet (or packets) traverses between a source and a destination. The traceroute data typically includes an IP address of each node along the path and an amount of time each hop (between adjacent nodes) takes, for example as shown in FIG. 3, which illustrates exemplary traceroute data 300 according to an embodiment.

Figure 3:
FIG. 3 illustrates exemplary traceroute data according to an embodiment.

In FIG. 3, traceroute data 300 includes 13 different entries representing different (e.g., successive) hops from the source. As will be recognized by those skilled in the relevant art(s), this is an example of traceroute data only—more or fewer entries are possible for any given traceroute dataset. For each entry, there are three round-trip time measurements and an ingress address (here, IP address) for the hop interface. Sometimes some devices along the path can be configured to ignore traceroute commands and therefore incomplete data is provided, as with entry 12 in FIG. 3. Typically, traceroute data may include many executions of traceroutes across diverse source-destination pairs which results in a large data set useful for inferring topology for a network.

Although FIG. 3 shows round-trip time measurements and ingress addresses, those skilled in the relevant art(s) will recognize that other data may be included or substituted, including for example time-varying data, data from host devices, data from router or network devices, etc. With time-varying data, embodiments of the present disclosure may infer routing protocols deployed in the real network as well as relative link costs. When Autonomous System (AS) information is also included, embodiments of the present disclosure may also determine additional metadata such as redundant topology paths. Embodiments of the present disclosure are capable of handling these additional data inputs for generating detailed topology models.

Returning to FIG. 1, in an embodiment, computing devices 102 and 104 are host devices which are in communication with each other, such as servers, personal computers, laptop computers, tablet computers, mobile phones, etc., or any devices that have network connectivity. For example, computing devices 102 and 104 may be in communication to support a network application. The network application may be any type of application including, for example, a client-server application or a peer-to-peer application. Communication between computing devices 102 and 104 may be enabled by one or more intermediate nodes. For example, communication between computing devices 102 and 104 may be enabled by nodes 106, 108, 110, 112, and 114, which along with computing devices 102 and 104 establish a communication path between computing devices 102 and 104.

In an embodiment, the communication path includes a plurality of links 118a-e as shown in FIG. 1. Each link 118a-e may include one or more data links and may include further network nodes. The links 118a-e may be, for example, coaxial and/or fiber optic, to name just a few examples, of a physical layer network. The physical layer network may be, for example, Synchronous Optical Networking (SONET)/Synchronous Digital Hierarchy (SDH), Ethernet, Optical Transport Network (OTN), Wavelength Division Multiplexing (WDM), and Digital Subscriber Line (DSL). These are by way of example only; other physical layer (Layer-1 or "L-1") networks are also within the scope of the present application, as would be understood by a person skilled in the relevant art(s). Typically, the physical layer is where the types of connectors, broadcast frequencies, broadcast wavelengths, and modulation schemes, among other low-level parameters, are defined to facilitate hardware-specific operations.

For example, one or more of the links 118a-e that connect L-1 devices (such as SONET/SDH circuits, OTN circuits, optical fibers, etc., which are designed to transmit the actual physical signals that comprise a bit stream of data) at the various nodes may be coaxial cables or optical fibers. In one embodiment, the links 118a-e may be SONET/SDH links that utilize optical fibers.

The intermediate nodes between computing devices 102 and 104 may include L-3 and/or Layer-2 (L-2) devices (e.g., switches or bridges that can be configured to receive packets or frames on one port (or interface) and selectively forward the packets or frames onto another port). In the example of FIG. 1, nodes 106, 108, 110, 112, and 114 may be L-3 devices, although other combinations are possible as will be recognized by those skilled in the relevant art(s).

L-3 devices perform packet routing based on maintained routing tables. Typically, a routing table at an L-3 device enables the device to map a packet's L-3 destination address to an outgoing interface on the device. In addition, L-3 devices may perform L-2 switching, as further described below. L-3 devices may further employ an L-3 to L-2 resolution protocol (e.g., Address Resolution Protocol (ARP)) to translate L-3 (e.g., IP) addresses to L-2 (e.g., Medium Access Protocol (MAC)) addresses, and may maintain ARP tables.

In an embodiment, some of the nodes (such as nodes 106 and 108) may be L-2 devices. L-2, or data link layer, devices include devices such as L-2 switches and bridges. L-2 devices implement frame switching, whereby a data frame received by an ingress interface (incoming data port) is switched for transmission by an egress interface (outgoing data port) based on an L-2 forwarding table. For example, L-2 switching may rely on a MAC forwarding table (MAFT), which maps frame destination MAC addresses to outgoing data port numbers of the L-2 device. Typically, each ingress/egress interface has an associated MAC address. L-2 devices typically construct their respective L-2 forwarding tables based on source L-2 addresses contained in received frames (data or control frames).

Although L-2 devices are typically not visible via traceroute information, embodiments of the present disclosure are able to infer L-2 topologies based on the de-confliction of IP subnet addressing. Examples of de-confliction are discussed below with respect to FIG. 8B. Thus, L-2, or combined L-2/L-3 topologies may also be inferred.

In an embodiment, each of the nodes 106, 108, 110, 112, and 114 may be L-3 devices. As discussed above, detailed configuration information is typically not available to a network administrator for all of nodes 106, 108, 110, 112, and 114 and links 118a-e that a packet traverses along the communication path between computing devices 102 and 104. For example, a network administrator may have control of a local or wide area network that includes computing device 102 and node 106, while the rest of the nodes 108, 110, 112, and 114 may be outside the local network. For example, the rest of the nodes may be part of the Internet where the network administrator does not have access to configuration files for the nodes 108, 110, 112, and 114.

Alternatively, the network administrator may have control of a local area network that includes computing device 104 and node 108. As will be recognized by those skilled in the relevant art(s), control may be over more or fewer than just nodes 106 and 108. In an embodiment, the network administrator may not have control over any of the nodes 108, 110, 112, and 114. As used herein, "network administrator" refers to any entity, such as a person or program, that can access configuration files for a given node and perform other control functions with respect to a computer network.

Embodiments of the present disclosure are discussed with respect to traceroute data as the input data. Other types of input data include data generated from a ping and endmap data. For simplicity of discussion, reference to input data herein will be with respect to traceroute data, such as shown in FIG. 3. In an embodiment, traceroute data 300 may include thousands or millions of individual address entries relating to the path one or more packets have taken through a network between a source and a destination. In an embodiment, those address entries are of IP addresses.

Figure 2:
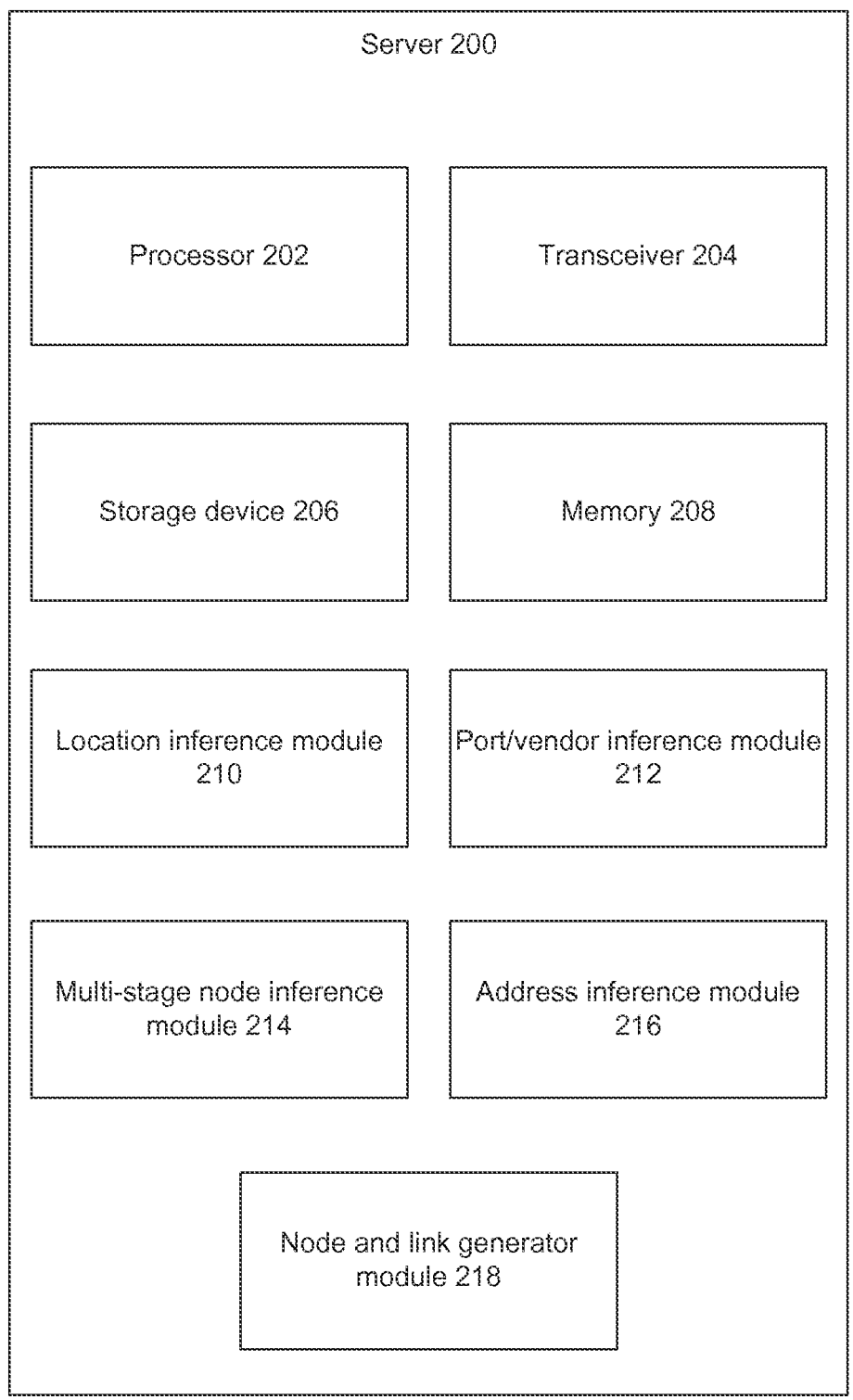
FIG. 2 illustrates an exemplary server apparatus according to an embodiment.

FIG. 2 illustrates an exemplary server 200 according to an embodiment. The server 200 may be used, for example, to generate the detailed topology models of the present disclosure. Alternatively, another computing device may use the generated data to generate topology models. Although described as a server, those skilled in the relevant art(s) will recognize that other computing devices may also be used to generate the information that is then used in generating detailed topology models. The server 200 may include one or more processors 202. The one or more processors 202 may each include one or more processing cores, capable of performing parallel or sequential operations, for example by use of threads. Server 200 may also include a transceiver 204, for example an Ethernet connection, WiFi connection, or other connection capable of enabling the server 200 to transmit and receive data to/from external sources. The server 200 may include a storage device 206, for example a hard drive, flash drive, or other types of long-term storage as will be understood by persons skilled in the relevant art(s). The server may also include memory 208, such as random access memory (RAM).

When the server 200 operates to generate information that will be used in generating network topology models, the server 200 may determine a location for each address in the traceroute data 300 using location inference module 210. In an embodiment, the location inference module 210 is a module that operates to determine a geographic location associated with one or more of the addresses listed in the traceroute data 300. The location inference module 210 may determine the geographic location of addresses by sending a request to an external database, such as one or more used by internet vendors, as will be discussed in more detail below with respect to FIG. 5. The external database may provide varying levels of detail for each address in the traceroute data 300, for example country, state, city, latitude, longitude, and company from which the address originates to name just a few examples. In an embodiment, the location inference module 210 obtains geographic location information for each address in the traceroute data 300. The server 200 may use this geographic location information for data pre-processing or in other inference components.

The server 200 may infer port and/or vendor type information using port/vendor inference module 212. In an embodiment, the port/vendor inference module 212 determines an interface name for each or some of the addresses listed in the traceroute data 300. For example, the port/vendor inference module 212 may determine an interface name for each address listed in the traceroute data 300. When the interface name for a given address is already available to the port/vendor inference module 212, for example by inclusion in the traceroute data 300, the port/vendor inference module 212 parses the name for clues about the interface. Aspects of the name may provide enough information to infer port type and capacity, router type and role, and additional network information as will be recognized by those skilled in the relevant art(s).

When the name is not already available, then the port/vendor inference module 212 may perform a database lookup to obtain the name. In an embodiment, the port/vendor inference module 212 may perform a reverse domain name system (DNS) lookup to determine an interface name. Typically, network administrators follow general practices and naming conventions when configuring the devices corresponding to the addresses in the traceroute data 300. For example, a typical naming convention for devices may include text such as <media-type Slot#/Port#>, in addition to other text to indicate relevance. The media-type may be specified in a variety of ways, including, for example, string identifiers that each represent a different media type related to a vendor device. Some examples include Fa (FastEthernet on a Cisco device), Fe (FastEthernet on a Juniper device), Te (TenGigEthernet on a Cisco device), as well as Gi, Ge, xe, Pos, Po, ae, as, t1, and t3. These are just a few examples. Some or each of these string identifiers can also have alternative string identifiers. For example, Te may also be identified as TenGi, Tgig, TgE, 10g, or ten.

With the corresponding name, the port/vendor inference module 212 may create a dictionary of string identifiers with corresponding details. The dictionary may be an internal dictionary, e.g. stored in storage device 206, or may alternatively/additionally be stored on an external storage device or external database. In an embodiment, the dictionary may be created autonomously based only on the name data and data related to the name data (e.g., obtained from a vendor's data sheet or other materials). Alternatively or additionally, the port/vendor inference module 212 may receive user oversight to create the dictionary. The port/vendor inference module 212 may map the interface names for the addresses in the traceroute data 300 with entries in the dictionary of string identifiers. With this mapping, the port/vendor inference module 212 is then able to infer port and/or vendor type information about the addresses in the traceroute data 300. In an embodiment, the port/vendor inference module 212 obtains names and infers port and/or vendor type information for each address listed in the traceroute data 300. Details of this process will be discussed in more detail below with respect to FIG. 6.

The server 200 may also infer nodes using multi-stage node inference module 214. The multi-stage node inference module 214 may perform node inference, which may be the process of grouping individual addresses into a single logical device or node based on relational information present in the traceroute data 300. The relational information may relate to the relationships between neighboring addresses. As an example, the traceroute data 300 in FIG. 3 shows that entry 2's previous hop is from entry 1 and the next hop is to entry 3. A "previous hop" herein refers to a hop from an address neighbor immediately prior to the address being analyzed in the list of entries. A "next hop" herein refers to a hop to an address neighbor immediately subsequent to the address being analyzed in the list of entries.

In an embodiment, the multi-stage node inference module 214 creates two datasets for each given address that appears in the traceroute data 300. The first dataset is a backward neighbors set and includes addresses associated with previous hops relative to the given address. The second dataset is a forward neighbors set and includes addresses associated with next hops relative to the given address. In an embodiment, the addresses listed in the traceroute data 300 being analyzed are ingress addresses for a node. Accordingly, the multi-stage node inference module 214 may assume that the addresses listed in the backward neighbors set reach the given address via the same interface, which can imply that interfaces corresponding to the addresses in the backward neighbors set may belong to the same subnet as the given address. Based on this assumption and implication, the multi-stage node inference module 214 may group the addresses in the backward neighbors set for a given address into the same logical node.

The multi-stage node inference module 214 may perform multiple passes over the addresses in the traceroute data 300 in order to form backward neighbors sets and forward neighbors sets for each address, assign each backward neighbors set to a different logical node, check that related addresses are not assigned to conflicting nodes, and infer egress address information for the logical nodes. In an embodiment, the multi-stage node inference module 214 performs two passes over the address data, the first pass to infer nodes and the second pass to resolve any node assignment conflicts. The multi-stage node inference module 214 may perform additional passes. With each additional pass, the multi-stage node inference module 214 may further refine the inferred nodes from the address data. Details of this process will be discussed in more detail below with respect to FIGS. 8A-8B.

The server 200 may also infer additional addresses using address inference module 216. As mentioned above, the addresses in the traceroute data 300 refer to an ingress address for each hop. Further, some of the egress addresses for a given node may have been inferred by the multi-stage node inference module 214. This leaves some inferred nodes without corresponding egress addresses. To be able to generate a complete topology model, however, the server 200 infers egress addresses for the remaining nodes that have egress ports with no assigned egress address. In an embodiment, the address inference module 216 may rely on subnet addressing in order to assign incomplete addresses. Details of this process will be discussed in more detail below with respect to FIG. 9.

The server may also generate complete node and link information using node and link generator module 218. In an embodiment, the node and link generator module 218 generates, for each inferred node, node or device information which includes the location and vendor of the node, the name assigned to each inferred node, the number of known interfaces (e.g., ingress and egress) and their type, and how many interfaces were inferred for the node. Other data may also be included, as will be recognized by those skilled in the relevant art(s). The node and link generator module 218 can also construct links between the inferred nodes based on the previously-established (e.g., by the multi-stage node inference module 214) neighbor relationships in a manner that preserves the node and port assignments inferred by the other modules. The node and link generator module 218 may additionally output this data for use by one or more modeling systems, for example in extensible markup language (XML) format. Details of this process will be discussed in more detail below with respect to FIG. 10.

Figure 12:
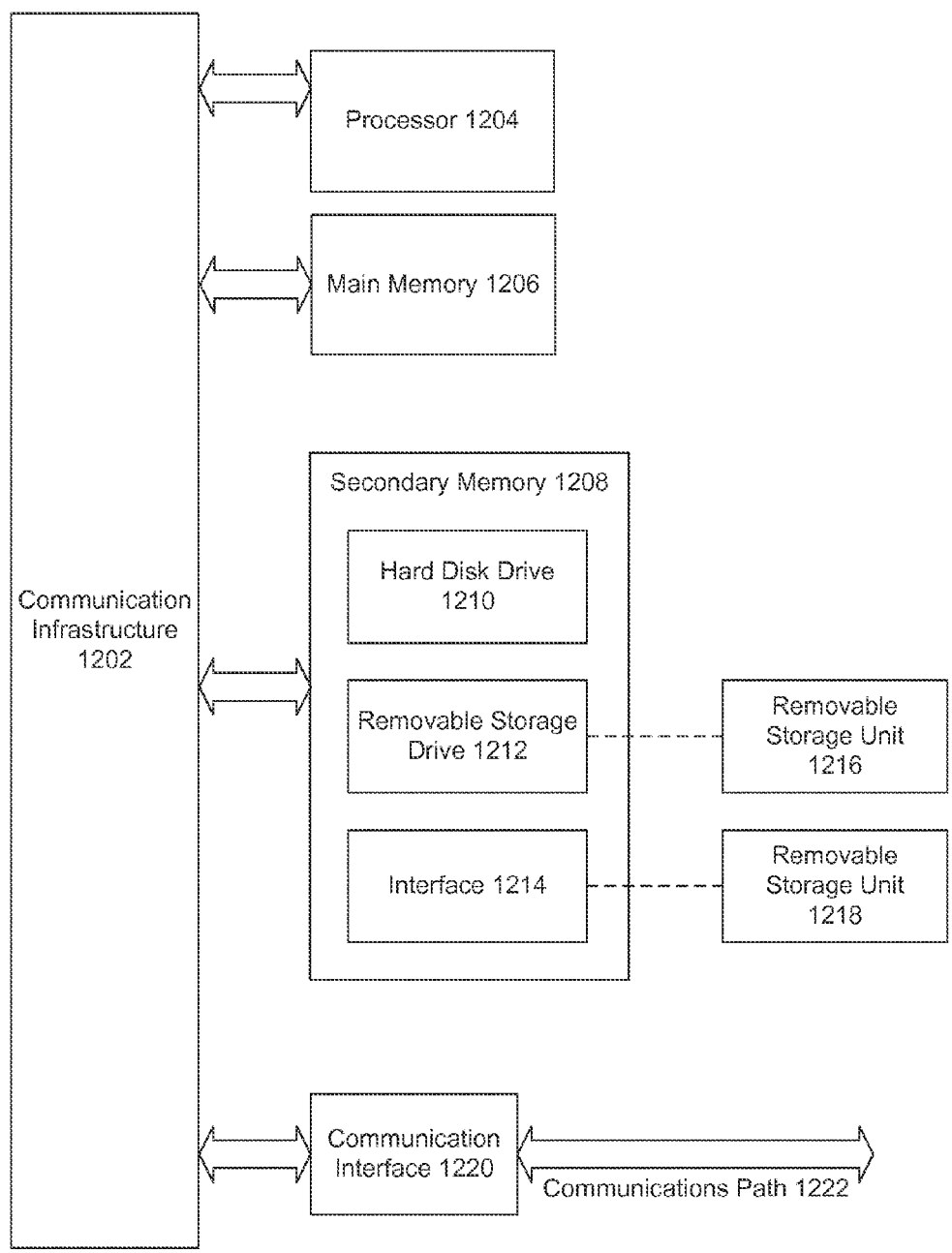
FIG. 12 illustrates an exemplary computer system that can be used to implement aspects of embodiments.

An exemplary embodiment of server 200 will be discussed in further detail below with respect to FIG. 12. As will be recognized by those skilled in the relevant art(s), the different functions of server 200 depicted in FIG. 2 may be performed within the server 200, or alternatively may be performed by a plurality of different servers or other types of computing devices operating in cooperation within a geographic vicinity of each other or at geographically different locations.

Example Node and Link Inference Algorithms

Figure 4:
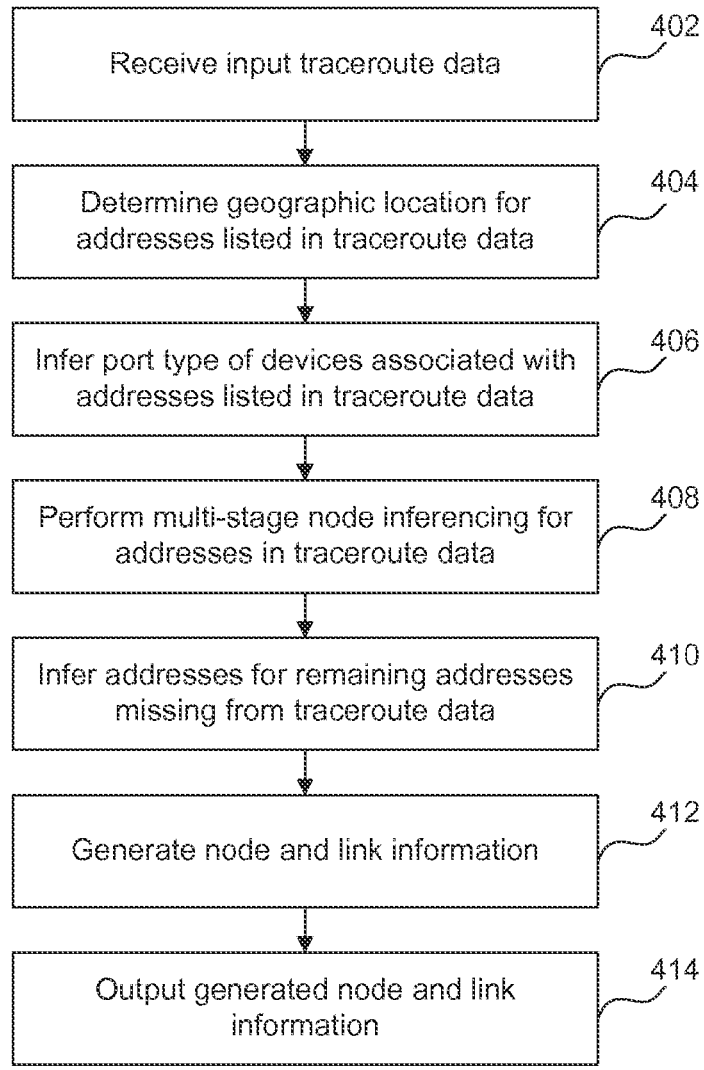
FIG. 4 illustrates an exemplary process for inferring node and link information according to an embodiment.

FIG. 4 illustrates an exemplary process 400 for inferring node and link information according to an embodiment. Process 400 provides a high-level view of an exemplary embodiment which will be discussed in more detail in subsequent figures. Although the exemplary process 400 may be performed on any number of computing devices, the following figures will be described with respect to the server 200 of FIG. 2, by way of a nonlimiting example.

At step 402, the server 200 receives traceroute data, such as traceroute data 300. In an embodiment, the server 200 may receive the traceroute data via transceiver 204. The traceroute data for a given packet may be received from each intermediate node along the packet path which sends packets back to the source. The traceroute data can include data resulting from one or more packets distributed over the network. In an embodiment, the packets are internet control message protocol (ICMP) packets. The ICMP packets may include data such as discussed above with respect to FIG. 3. In an embodiment, the traceroute data is generated by a traceroute utility, such as 'traceroute' in UNIX and 'tracert' in WINDOWS.

At step 404, the server 200 determines geographic locations for addresses listed in the traceroute data. In an embodiment, the location inference module 210 determines the geographic location for each IP address in the traceroute data. The server 200, via the location inference module 210, may store the determined locations in one or both of the memory 208 and the storage device 206 for subsequent use.

At step 406, the server 200 infers the port type and/or vendor type of the devices associated with the addresses listed in the traceroute data. In an embodiment, the port/vendor inference module 212 infers the port and/or vendor types for each IP address in the traceroute data. The server 200 may store the inferred port and/or vendor type information in one or both of the memory 208 and the storage device 206 for subsequent use.

At step 408, the server 200 infers nodes by grouping individual addresses listed in the traceroute data into one or more logical nodes. In an embodiment, the multi-stage node inference module 214 groups each IP address in the traceroute data into the one or more logical nodes. The multi-stage node inference module 214 may also assist in inferring egress addresses based on complementary address relationships in the traceroute data. The server 200 may store the grouped node information in one or both of the memory 208 and the storage device 206 for subsequent use.

At step 410, the server 200 infers addresses for ports in the logical nodes that have no associated addresses yet. In an embodiment, the address inference module 216 infers IP addresses for egress ports of logical nodes that have not been assigned yet. For example, one or more egress ports for a logical node may not have been included in the traceroute data and not inferred during step 408. In an embodiment, the address inference module 216 may rely on subnet addressing in order to assign incomplete addresses. The server 200 may store the inferred addresses in one or both of the memory 208 and the storage device 206 for subsequent use.

At step 412, the server 200 generates node and link information. In an embodiment, the node and link generator module 218 generates node or device information that includes the location and vendor of each inferred node, the name assigned to each inferred node, the number of known interfaces (e.g., ingress and egress) and their type for each inferred node, and how many interfaces were inferred. The server 200 may rely on the generated data from the other modules that has been stored in the memory 208 and/or the storage device 206. The node and link generator 218 may also generate links between the inferred nodes based on neighbor relationships in the IP addresses of the traceroute data.

At step 414, the server 200 outputs the node information and link information for use in topology model generation.

Different steps of process 400 will be discussed in more detail below with respect to FIGS. 5-10.

Geographic Location Inference

Figure 5:
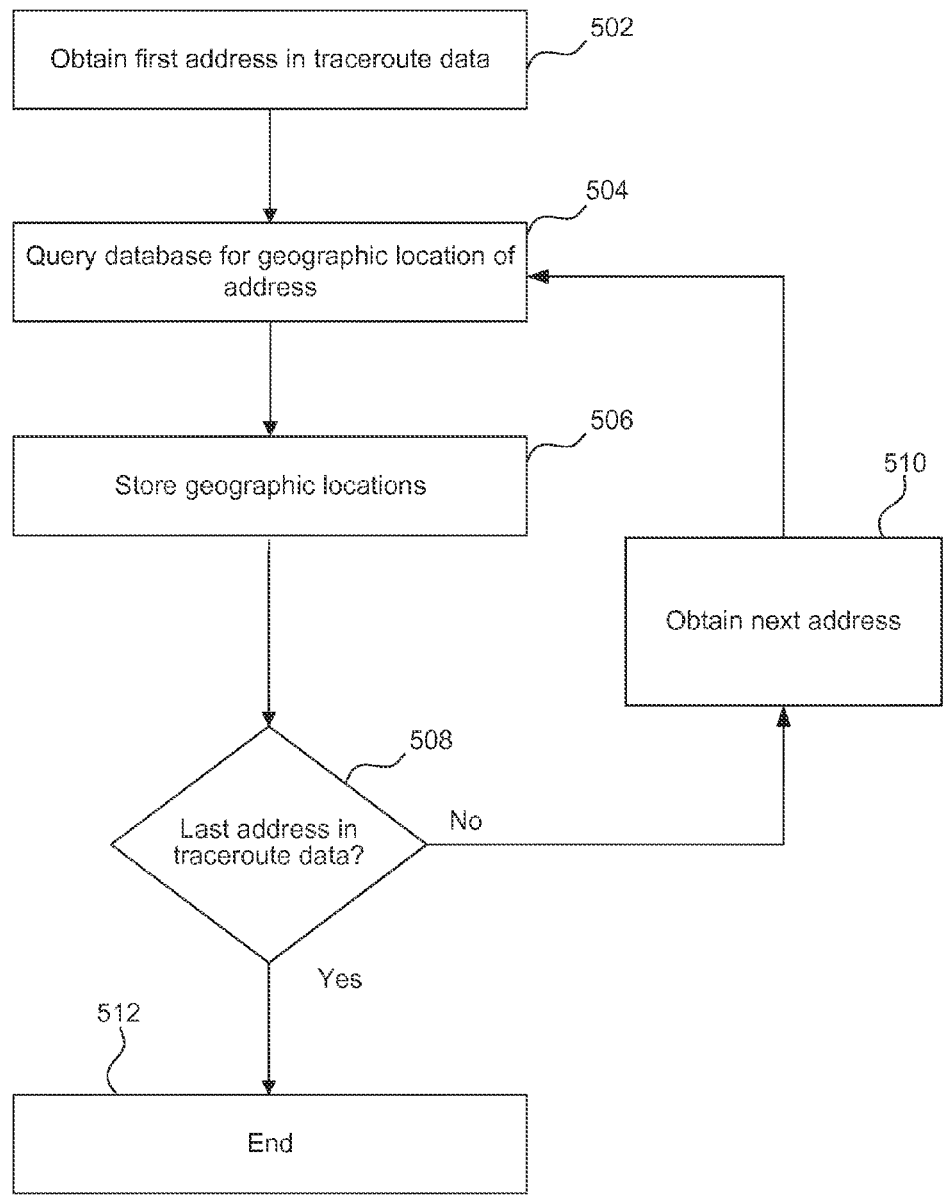
FIG. 5 illustrates an exemplary process for determining geographic location information for addresses according to an embodiment.

FIG. 5 illustrates an exemplary process 500 for determining geographic location information for addresses according to an embodiment. Process 500 may be an embodiment of step 404 of FIG. 4 and may be performed by the server 200 of FIG. 2. In FIG. 5, the process 500 describes the determination of geographic location information for each address in the traceroute data (where available). As will be recognized by those skilled in the relevant art(s), the server 200 may alternatively determine the geographic location information for only some of the addresses in the traceroute data. In an embodiment, the location inference module 210 of server 200 performs the process 500.

At step 502, the server 200 obtains the first address in the traceroute data. Referring to the traceroute data 300 of FIG. 3, for example, the server 200 obtains the IP address from entry 1.

At step 504, the server 200 queries a database for a geographic location of the address. In an embodiment, the query is a request that the server 200 sends to an external database, such as one used by internet vendors. Alternatively, the server 200 may maintain an internal database of geographic location information for addresses. In response to the query, the server 200 receives location information— referred to as a geo-record—regarding the address. For example, the geo-record may assume the following format and information types:

{'city': 'Cincinnati', 'region_name': 'OH', 'area_code': 513, 'time_zone': 'America/New York', 'dma_code': 515, 'metro_code': 'Cincinnati, OH', 'country_code3': 'USA', 'latitude': 39.162000000000006, 'postal_code':", 'longitude': −84.4569, 'country_code': 'US', 'country_name': 'United States'}.

At step 506, the server 200 stores the received geo-record, such as in the memory 208 or the storage device 206.

At step 508, the server 200 determines whether the address is the last address in the traceroute data, for example the last entry in the traceroute data 300 of FIG. 3. If the server 200 determines that the address is the last entry at step 508, then the process 500 proceeds to step 512 when it ends. If the server 200 determines that the address is not the last entry, then the process 500 proceeds to step 510.

At step 510, the server 200 obtains the next address in the traceroute data, such as the next entry in the traceroute data 300 of FIG. 3. Once the server 200 has the next address, the process 500 proceeds back to step 504 to obtain the geographic location information of the next address.

The server 200 may use this geographic location information for data pre-processing or in other inference components.

Port Type Inference

Figure 6:
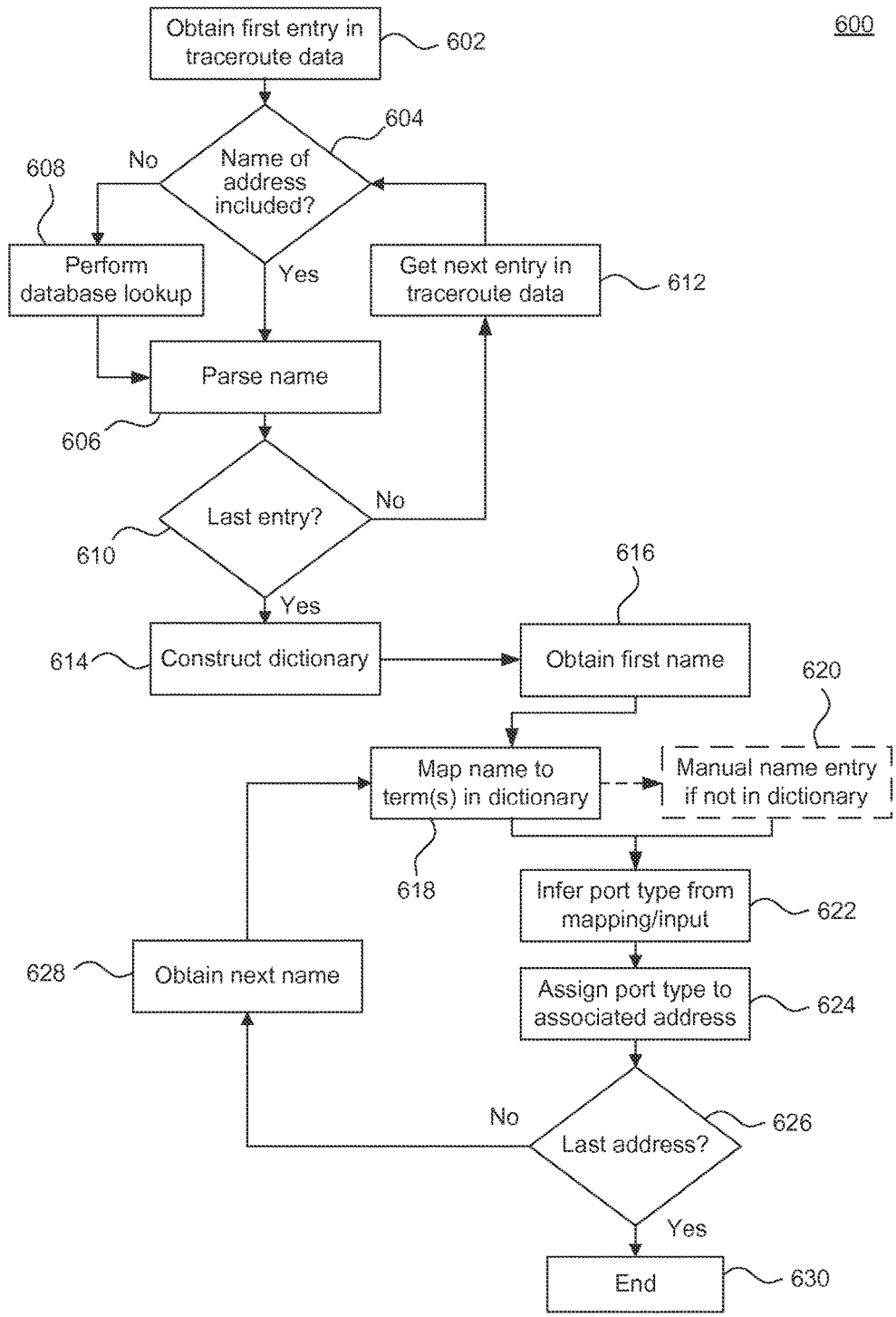
FIG. 6 illustrates an exemplary process for inferring device information according to an embodiment.

FIG. 6 illustrates an exemplary process 600 for inferring device information according to an embodiment. Process 600 may be an embodiment of step 406 of FIG. 4 and may be performed by the server 200 of FIG. 2, for example by the port/vendor inference module 212.

At step 602, the server 200 obtains the first entry in the traceroute data (which includes the address). Referring to the traceroute data 300 of FIG. 3, for example, the server 200 obtains entry 1, including all the information associated with it.

At step 604, the server 200 determines whether the entry data obtained at step 602 (or step 612 as will be discussed below) includes a name associated with the address. As mentioned above, the name may be an interface name associated with the address, e.g. an ingress address for an ingress port of a device.

When the server 200 determines at step 604 that the entry data includes the name, the process 600 proceeds to step 606 where the server 200 parses the name for clues about the interface, as discussed above with respect to FIG. 2. For example, when parsing the name the server 200 may be searching for specific identifiers, such as media type or other identifiers.

When the server 200 determines at step 604 that the entry data does not include the name, the process proceeds to step 608 where the server 200 performs a database lookup to obtain the name. In an embodiment, this may be a reverse DNS lookup. Once the server 200 receives the name in response to the database lookup, the process 600 proceeds to step 606 where the name is parsed and analyzed.

Subsequently, the process 600 proceeds to step 610, where the server 200 determines whether the address is the last address in the traceroute data, for example the last entry in the traceroute data 300 of FIG. 3. If the address is not the last address, then the process 600 proceeds to step 612, where the server 200 obtains the next entry in the traceroute data, such as the next entry in the traceroute data 300 of FIG. 3. The process 600 then proceeds back to step 604 to determine whether the entry data includes the name corresponding to the entry's address.

If, at step 610, the entry is the last entry in the traceroute data, then the process 600 proceeds to step 614.

At step 614, the server 200 uses the parsed name information to create a dictionary of string identifiers. The dictionary provides, for the string identifiers, corresponding details regarding the interface, such as vendor type, port type and capacity, router type and role, and additional network information as will be recognized by those skilled in the relevant art(s). In an embodiment, the server 200 creates the dictionary without user input based on the details obtained from the parsed names and publicly available information (e.g., datasheets and other details from vendors and other sources). Alternatively, the server 200 may create the dictionary with user input, or solely based on user input. In an embodiment, the server 200 may create the dictionary with user input for some entries and/or details, and automatic processes for other entries and/or details.

In an alternative embodiment, the server 200 stores a permanent dictionary in the storage device 206 that persists across different traceroute data sets. In this embodiment, the server 200 may still do an initial comparison of the parsed names with the dictionary entries to determine whether any updates are necessary to the dictionary. Further, the server 200 may perform the update either automatically (e.g., without user request or requirement for user input) or in response to a request for manual input. In an embodiment, the server 200 may request manual user entry for the update, for example in situations where an automatic update has failed.

After the server 200 has created the dictionary, the process 600 proceeds to step 616, where the server 200 obtains the name corresponding to the first address in the traceroute data. Referring to the traceroute data 300 of FIG. 3, for example, the server 200 obtains the name corresponding to the IP address from entry 1.

At step 618, the server 200 maps the name corresponding to the IP address to an entry in the dictionary. The server 200 may map the name by traversing entries in the dictionary until a match is found. When a match is found, the server 200 may proceed to step 622 without traversing the rest of the dictionary. Alternatively, the server 200 may continue traversing the dictionary after a match is found and, if any conflicts (e.g., a name matching more than one entry) arise, alert a user to resolve the conflict.

If, at step 618 no match is found, the process 600 may proceed to step 620 where the server 200 requests manual port and/or vendor type entry for the current name. Alternatively, when no match is found at step 618, the process 600 may proceed instead to step 626 and skip further processing for the current name.

If a match is found at step 618 and/or manual entry is received at step 620, the process 600 proceeds to step 622. At step 622, the server 200 infers port and/or vendor type information about the current name based on the matched entry in the dictionary. For example, the server 200 may infer the media type of the port based on the mapping to an entry in the dictionary.

At step 624, the server 200 assigns the inferred port and/or vendor type information about the current name to the name's corresponding address. In an embodiment, the server 200 associates the inferred port and/or vendor type information with the rest of the entry data corresponding to the current address under analysis.

At step 626, the server 200 determines whether the address, corresponding to the name, in the traceroute data is the last address in the traceroute data, for example the last entry in the traceroute data 300 of FIG. 3. If the server 200 determines that the address is the last entry at step 626, then the process 600 proceeds to step 630 and the process 600 ends. If the server 200 determines that the address is not the last entry, then the process 600 proceeds to step 628.

At step 628, the server 200 obtains the next name corresponding to the next address in the traceroute data, such as the next entry in the traceroute data 300 of FIG. 3. Once the server 200 has the next name, the process 600 proceeds back to step 618 to map the name to an entry in the dictionary. This continues until the last name is mapped or the process 600 is otherwise terminated, for example by user request.

Node Inference

Figure 7:
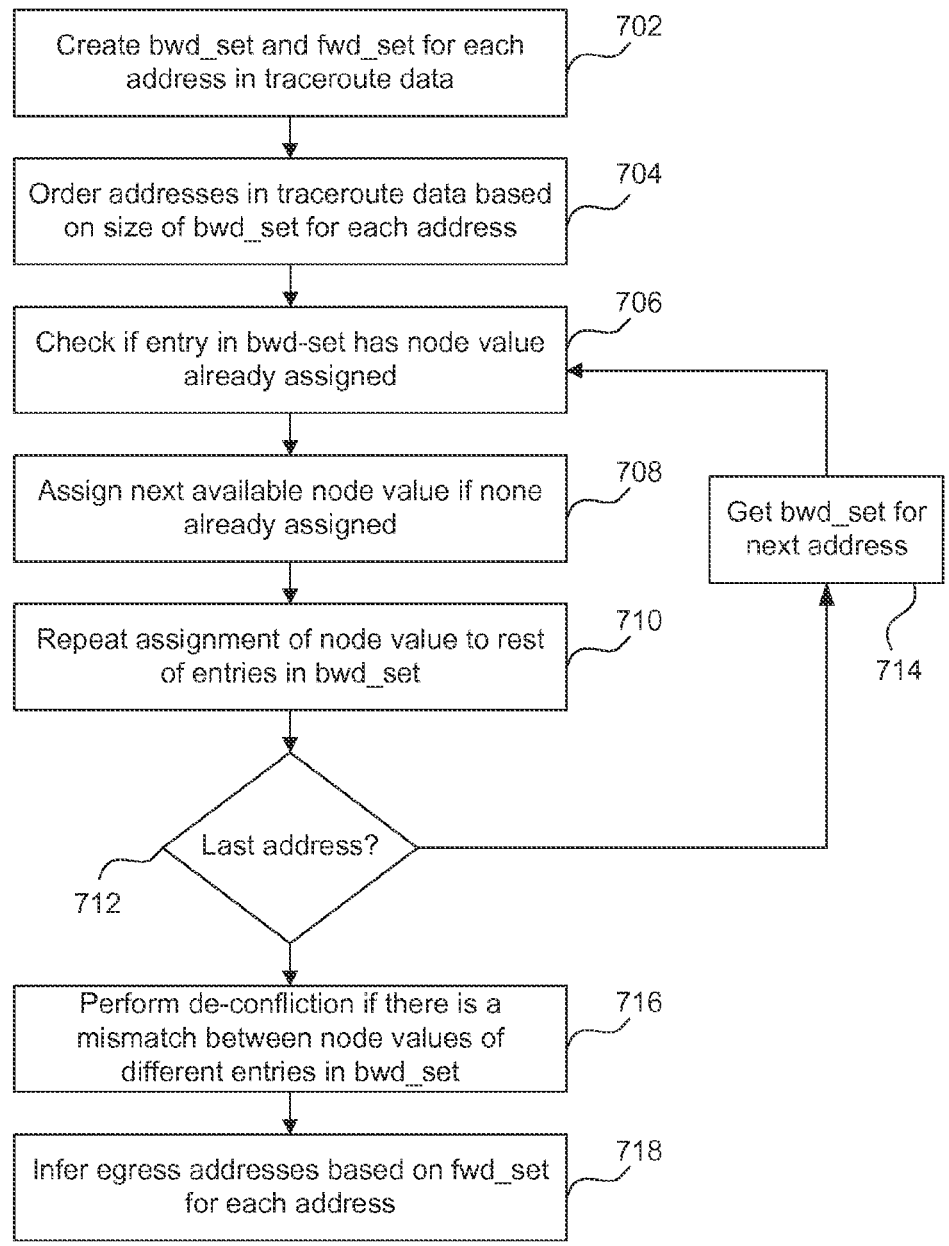
FIG. 7 illustrates an exemplary process for inferring node information according to an embodiment.

FIG. 7 illustrates an exemplary process 700 for inferring node information according to an embodiment. Process 700 may be an embodiment of step 408 of FIG. 4 and may be performed by the server 200 of FIG. 2, for example by the multi-stage node inference module 214.

At step 702, the server 200 creates a backward neighbors set ("bwd_set") and a forward neighbors set ("fwd_set") for each of the addresses in the traceroute data—e.g., for each address entry in the traceroute data, the server 200 creates two data sets—one including addresses associated with previous hops relative to the current address and another including addresses associated with next hops relative to the current address.

At step 704, the server 200 orders the addresses of the traceroute data based on the size of the addresses' associated backward neighbors sets. For example, the server 200 may arrange the addresses such that the address with the largest backward neighbors set comes first in subsequent processing. Alternatively, the server 200 may arrange the addresses such that the address with the smallest backward neighbors set comes first, that the address with the largest forward neighbors set comes first, or that the address with the smallest forward neighbors set comes first.

At step 706, the server 200 checks the individual addresses within a backward neighbors set of a given address to determine whether any of the individual addresses have already been assigned a node value, such as a node number. In an embodiment, based on the ordering done in step 704, the server 200 may begin with the address having the largest corresponding backward neighbors set to perform steps 706, 708, 710, and 712, and then proceed to other addresses in the ordered list repeating the same steps for each address. If the server 200 determines that any of the individual addresses within the backward neighbors set have already been assigned a node value, the server 200 may flag the individual address(es) that already have a node value for review at step 716. If the server 200 determines that none of the individual addresses have a node value assigned already, the process 700 proceeds to step 708.

At step 708, the server 200 assigns the next available node value to the individual address in the backward neighbors set for the given address.

At step 710, the server 200 assigns the same node value to the remaining individual address (or addresses) that do not yet have node values in the current backward neighbors set.

At step 712, the server 200 determines whether the address is the last address in the ordered list of the traceroute data. If the server 200 determines that the address is the last entry at step 712, then the process 700 proceeds to step 716. If the server 200 determines that the address is not the last entry, then the process 700 proceeds to step 714.

At step 714, the server 200 obtains the next address in the traceroute data, such as the next address in the ordered list of the addresses in the traceroute data. Once the server 200 has the next address, the process 700 proceeds back to step 706.

At step 716, the server 200 performs de-confliction of the node values of the backward neighbors set when there are mismatches between individually-assigned node values in the same set. Step 716 is another pass on the addresses that enables the server 200 to refine the assigned node values so that individual addresses within the same backward neighbors set are not given different values. In an embodiment, the server 200 may use additional data, such as one or more of the data generated by the location inference module 210 and the port/vendor inference module 212, to aid in determining which node value should be associated with a given backward neighbors set.

At step 718, the server 200 goes through the addresses in the traceroute data again, this time to infer egress addresses based on each address's associated forward neighbors set. As discussed above with respect to FIG. 2, the addresses listed in the traceroute data may represent ingress addresses for the different nodes along the packet path. To enable generation of a more thorough model, however, the server 200 may infer egress addresses for at least some of the egress interfaces of the inferred nodes. For example, the server 200 may assume that the core links between some of the nodes may use /30 (where only 2 IP addresses are available) or /31 (where only 4 IP addresses are available) addressing. In such a situation, the server 200 may look for complementary interface addresses in the traceroute data. Where the server 200 identifies complementary interface addresses, the server 200 may assign the complementary interface addresses to the egress addresses of the inferred node(s). The server 200 may make similar assumptions for core links that use /28 (where 16 IP addresses are available) or /24 (where 256 IP addresses are available) subnet addressing. In embodiments where the server 200 utilizes these assumptions for /28 and /24 subnet addresses, more passes through the data may be required for de-confliction between mismatching node values for different inferred nodes in the set.

As will be discussed in more detail below with respect to FIGS. 8A and 8B, the node values assigned to the different addresses in the backward neighbors sets are used to group the sets into inferred, logical nodes.

Figure 8A:
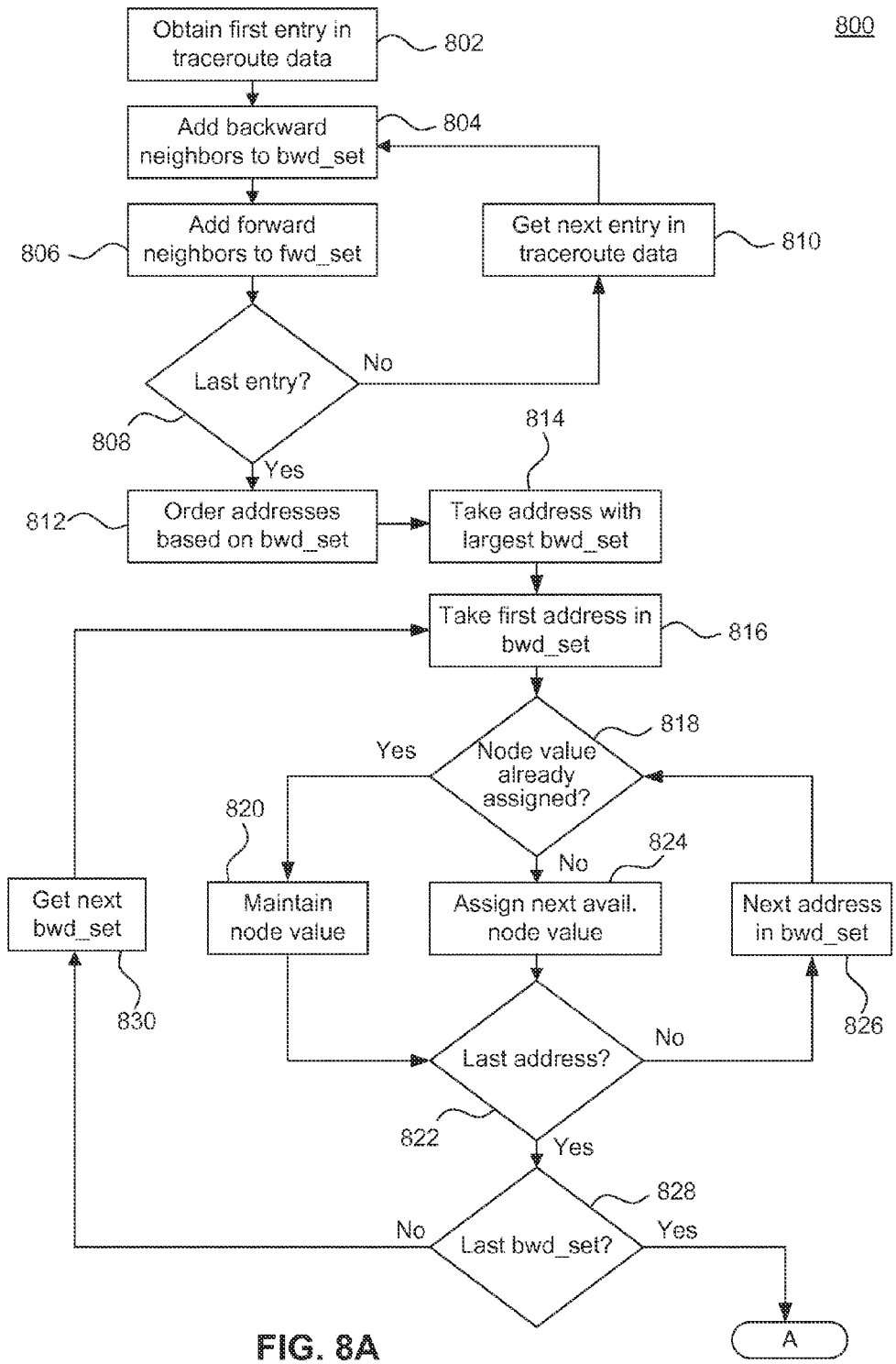
FIGS. 8A and 8B illustrate an exemplary process for inferring node information according to an embodiment.
Figure 8B:
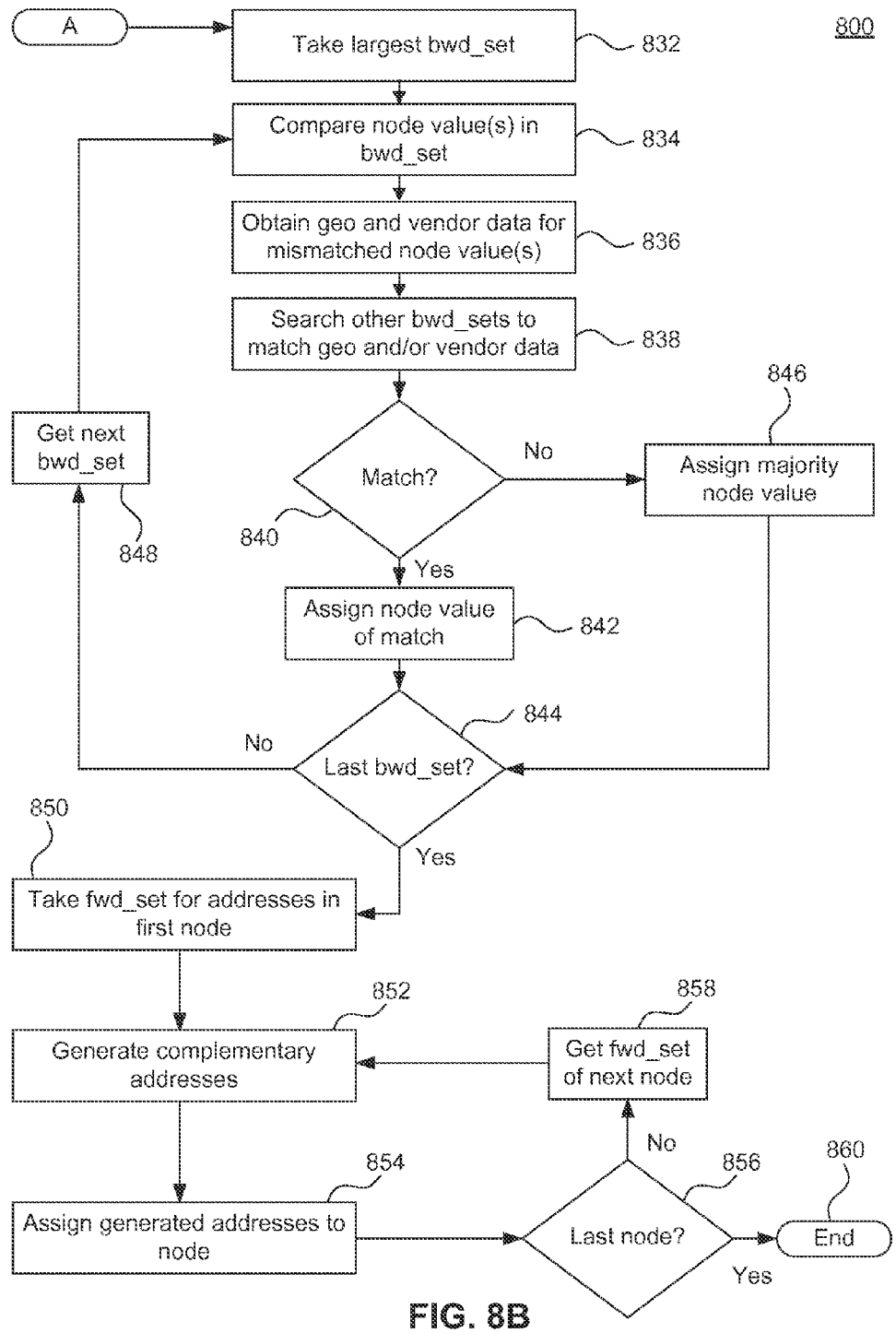

FIGS. 8A and 8B illustrate an exemplary process 800 for inferring node information according to an embodiment. Process 800 may be an embodiment of step 408 of FIG. 4 and may be performed by the server 200 of FIG. 2, for example by the multi-stage node inference module 214. The process 800 illustrates an embodiment of the multi-stage node inferencing process 700 discussed above with respect to FIG. 7.

At step 802, the server 200 obtains the first entry in the traceroute data (which includes the address). Referring to the traceroute data 300 of FIG. 3, for example, the server 200 obtains entry 1 including all the information associated with it.

At step 804, the server 200 creates a backward neighbors set for the obtained address. The backward neighbors set includes addresses associated with previous hops relative to the obtained address. In an embodiment, the server 200 reviews the rest of the traceroute data and identifies the previous and next hops surrounding each location at which the same obtained address exists. For example, in a large traceroute data set, the obtained address may appear multiple times. In such a situation, the server 200 will identify each entry of the obtained address and add the previous hop address to the backward neighbors set the server 200 is creating.

At step 806, the server 200 creates a forward neighbors set for the obtained address. The forward neighbors set includes addresses associated with next hops relative to the obtained address. Similar to the backward neighbors set, the server 200 identifies each time the obtained address appears in the traceroute data and addresses associated with next hops are identified and added to the forward neighbors set.

At step 808, the server 200 determines whether the address is the last address in the traceroute data, for example the last entry in the traceroute data 300 of FIG. 3. If the server 200 determines that the address is the last entry at step 808, then the process 800 proceeds to step 812. If the server 200 determines that the address is not the last entry, then the process 800 proceeds to step 810.

At step 810, the server 200 obtains the next address in the traceroute data, such as the next entry in the traceroute data 300 of FIG. 3. Once the server 200 has the next address, the process 800 proceeds back to step 804 to begin creating the backward neighbors and forward neighbors sets for the next address.

At step 812, the server 200 orders the addresses of the traceroute data based on the size of the addresses' associated backward neighbors sets, for example as created in process 800 at step 804. For example, the server 200 may arrange the addresses such that the address with the largest backward neighbors set comes first in subsequent processing.

At step 814, the server 200 obtains the address in the traceroute data that the server identified in step 812 as having the largest backward neighbors set. As will be recognized by those skilled in the relevant art(s), the server 200 may alternatively start with the address having the smallest backward neighbors set, or the largest (or smallest) backward neighbors set.

At step 816, the server 200 obtains the first address listed in the given backward neighbors set. Alternatively, the server 200 may start with a different address within the given backward neighbors set.

At step 818, the server 200 processes the address, for example the metadata associated with the address, to determine whether the address already has a node value assigned to it. If the address already has a node value assigned to it, the process 800 proceeds to step 820.

At step 820, the server 200 maintains the existing node value for use in subsequent de-confliction operations. In an embodiment, the server 200 may additionally set a flag with the address that already has a node value to aid in later de-confliction steps.

If the address does not already have a node value assigned to it, the process 800 proceeds to step 824. At step 824, the server 200 assigns the next available node value to the address. For example, the server 200 may use an integer numbering scheme and assign unique node values in a consecutive manner, e.g. 1, 2, 3, etc. Other number schemes are possible as will be recognized by those skilled in the relevant art(s).

At step 822, the server 200 determines whether the address is the last address in the given backward neighbors set. If the server 200 determines that the address is the last address at step 822, then the process 800 proceeds to step 828. If the server 200 determines that the address is not the last address, then the process 800 proceeds to step 826.

At step 826, the server 200 obtains the next address in the given backward neighbors set. Once the server 200 has the next address, the process 800 proceeds back to step 818 to check whether the address already has a node value assigned.

At step 828, the server 200 determines whether the address with the given backward neighbors set is the last address in the traceroute data. If the server 200 determines that the address is the last address at step 828, then the process 800 proceeds to step 832 in FIG. 8B. If the server 200 determines that the address is not the last address, then the process 800 proceeds to step 830.

At step 830, the server 200 obtains the next address in the ordered traceroute data. Once the server 200 has the next address, the process 800 proceeds back to step 816 to begin with the first address in the backward neighbors set of the next address in the ordered traceroute data.

In an embodiment, the server 200 may assign node values for each address in each backward neighbors set for each of the addresses in the traceroute data. Once these assignments are completed, the process 800 may proceed with de-confliction, or the process or resolving conflicts between assigned node values that, according to embodiments of the present disclosure, are assumed to be part of the same inferred logical node.

In FIG. 8B, the process 800 proceeds to step 832. At step 832, the server 200 begins another pass through the data to perform de-confliction by again starting with the address having the largest backward neighbors set from the traceroute data.

At step 834, the server 200 compares the node values of the individual addresses in the given backward neighbors set. With the comparison, the server 200 may be searching for any addresses in the given backward neighbors set which have conflicting assigned node values, such as a first address that has a first node value assigned to it and several other addresses within the same backward neighbors set that have a second node value assigned to them. This demonstrates a conflict between assigned node values of addresses in the given backward neighbors set. In an embodiment, the server 200 may determine that a majority of the addresses in the given backward neighbors set have the same assigned node value and identify the remaining address or addresses in the backward neighbors set as having mismatched node values. Although there may be one or more addresses in this situation, for simplicity of discussion reference will be made to address in the singular. For example, the server 200 may be assisted in this identification process by the address which has a flag already set at step 820 above, since the flagged address is more likely to have a different node value than the others in the given backward neighbors set.

At step 836, the server 200 obtains metadata relating to the address having the mismatched node value. In an embodiment, the metadata may include geographic location information previously obtained by the location inference module 210 as well as port and/or vendor type information generated by the port/vendor inference module 212, as well as other data provided for the address in the original traceroute data.

At step 838, the server 200 searches the other backward neighbors sets for the other addresses in the traceroute data to determine whether any of the mismatched node values, geographic location information, and port and/or vendor type information match the corresponding information of any of the other addresses in the other backward neighbors sets. In an embodiment, the server 200 searches for whether the mismatched node values of the given backward neighbors set match the assigned node value of an address in another backward neighbors set. Alternatively, the server 200 may search for matches with respect to the geographic location instead of or in addition to the node values. In an embodiment, the server 200 may identify the geographic location of other addresses to be a match if they are within a predetermined threshold of the geographic location information of the address having the mismatched node value. The server 200 may additionally or alternatively search for matching port and/or vendor type information, or any combination of the node value, geographic location information, and port and/or vendor type information matching.

At step 840, the server 200 identifies whether there is a match from the comparison performed at step 838. If there is a match, the process 800 continues to step 842, where the server 200 re-assigns the address having the mismatched node values the node value corresponding to the matching address in another backward neighbors set.

If there is no match at step 840, the process 800 proceeds to step 846. At step 842, the server 200 may assign the node value of the majority of addresses in the given backward neighbors set to the address having the mismatched node values.

Following both step 842 and 846, the process 800 proceeds to step 844. At step 844, the server 200 determines whether the address with the given backward neighbors set is the last address in the traceroute data. If the server 200 determines that the address is not the last address, then the process 800 proceeds to step 848.

At step 848, the server 200 obtains the next address in the ordered traceroute data. Once the server 200 has the next address, the process 800 proceeds back to step 834 compare the node values of the individual addresses in the given backward neighbors set.

If the server 200 determines that the address is the last address at step 844, then the process 800 proceeds to step 850 where the process 800 begins performing inferences based on the forward neighbors sets. At step 850, the server 200 obtains the forward neighbors set for the addresses in the first inferred logical node. For inferred logical nodes that have more than one address (with corresponding forward neighbors set), the server 200 may process the addresses in the same inferred logical node together in parallel or sequentially. When done sequentially, the server 200 may perform the following steps of 852 and 854 for each address's forward neighbors set in turn before proceeding to the next inferred logical node. The following discussion will be with respect to the addresses of a given logical node processed in parallel for simplicity of discussion.

At step 852, the server 200 generates complementary addresses for the corresponding addresses of the given logical node, based on the addresses in the forward neighbors set(s). In an embodiment, the server 200 searches for addresses in the forward neighbors set that have the /30 or /31 subnet prefix. The server 200 may assume that addresses with these subnets will have a complementary address corresponding to an egress interface on the same subnet that may be inferred. The server 200 may make similar assumptions for core links that use /28 or /24 subnet prefixes, but would require more passes through the traceroute data for de-confliction. In an embodiment, the server 200 generates an address that complements an address in the forward neighbors set. If there are multiple addresses in the forward neighbors set that use the identified subnet prefixes, such as /30 or /31 addressing, then the server 200 may generate complementary addresses for each of the addresses. This is done for each forward neighbors set associated with each address assigned to the given logical node.

At step 854, the server 200 assigns the generated complementary addresses to the given logical node. For example, if the address or addresses have been inferred to be at a first logical node, then the server 200 will assign the generated complementary addresses to the first logical node as well to represent egress interfaces on the first logical node.

At step 856, the server 200 determines whether the given logical node is the last logical node determined or inferred from the traceroute data. If the server 200 determines that the given logical node is the last logical node at step 856, then the process 800 proceeds to step 860 and the process 800 ends. If the server 200 determines that the given logical node is not the last logical node, then the process 800 proceeds to step 858.

At step 858, the server 200 proceeds to the next logical node inferred from the traceroute data. Once the server 200 has the next logical node, the process 800 proceeds back to step 852 to generate complementary addresses where possible based on the addresses in the forward neighbors set for the addresses inferred to be associated with the next logical node.

In an embodiment, the server 200 may repeat steps 802 through 848 multiple times, constituting multiple passes through the address data, in order to refine the inferred nodes from the address data. In an alternative embodiment, the server 200 may repeat all of the steps of process 800 in order to refine the inferred nodes, and ingress/egress ports for those nodes, from the address data.

Address Assignment Inference

Figure 9:
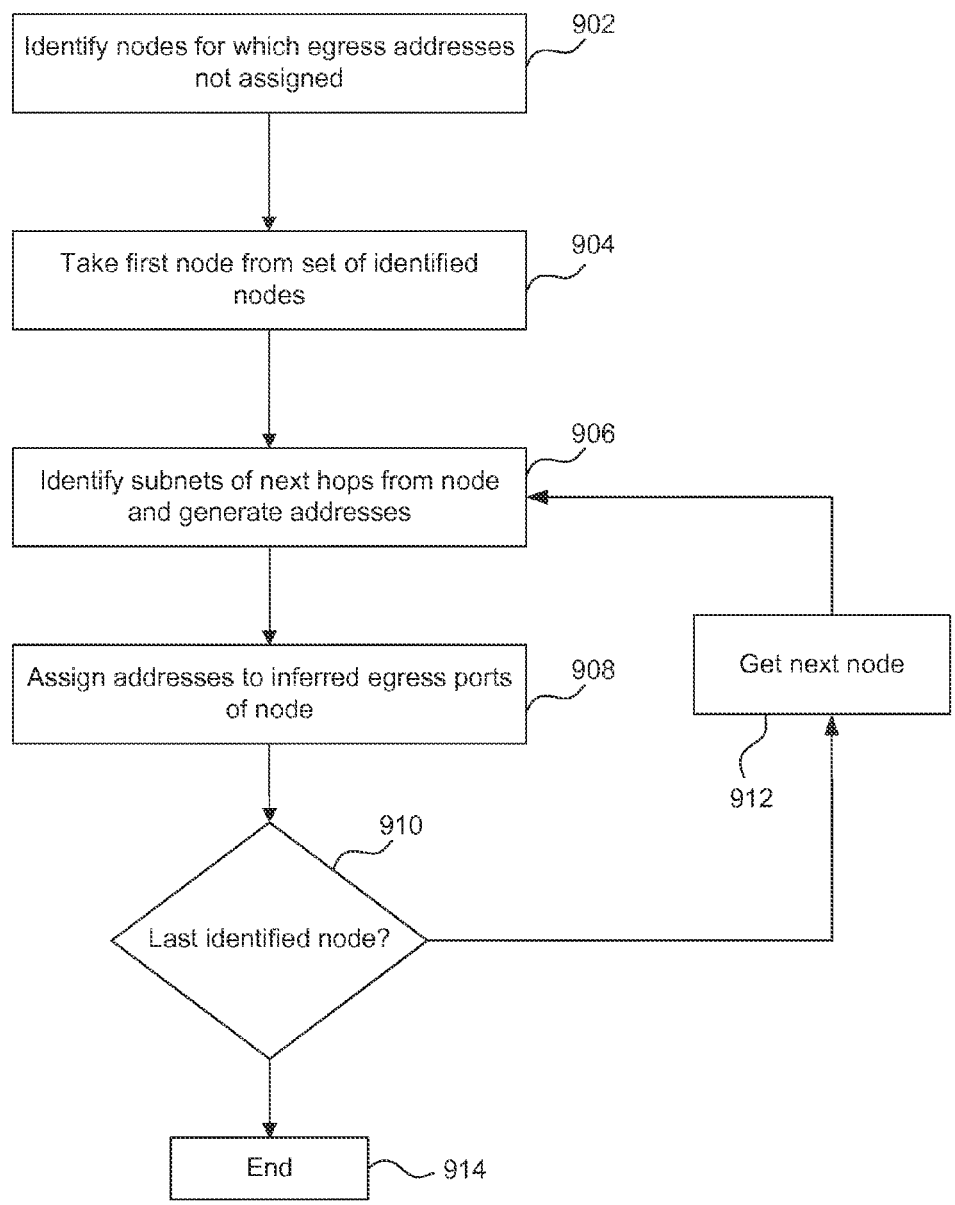
FIG. 9 illustrates an exemplary process for assigning addresses according to an embodiment.

FIG. 9 illustrates an exemplary process 900 for assigning addresses according to an embodiment. Process 900 may be an embodiment of step 410 of FIG. 4 and may be performed by the server 200 of FIG. 2, for example by the address inference module 216.

At step 902, the server 200 identifies the logical node that does not have all of its inferred egress interfaces assigned an address already. As will be recognized, there may be no inferred egress interfaces that are unassigned, one, or more than one in any given logical node. For simplicity of discussion, reference will be made to an interface and an address in singular, though it will be recognized that the same process applies to more than one interface and more than one address.

At step 904, the server 200 selects the first identified logical node that does not have all of its inferred egress interfaces assigned an address. In an embodiment, the inferred egress interfaces are egress ports.

At step 906, the server 200 identifies the subnet of the next hop for the current logical node. In an embodiment, the server 200 may do so based on one or more addresses in a forward neighbors set of one or more of the addresses assigned to the given logical node. Similar to step 852 of process 800, the server 200 may search for addresses in the forward neighbors set that have the /30 or /31 subnet prefix, or other subnet prefix as will be recognized by those skilled in the relevant art(s). The server 200 then generates addresses that fit within the identified subnet addressing scheme and which are not assigned to an interface yet.

At step 908, the server 200 assigns these generated addresses to the inferred egress interfaces of the logical node selected at step 904 (or step 912, as discussed below).

At step 910, the server 200 determines whether the selected logical node is the last logical node identified at step 902. If the server 200 determines that the selected logical node is the last identified logical node at step 910, then the process 900 proceeds to step 914 and the process 900 ends.

If the server 200 determines that the selected logical node is not the last identified logical node, then the process 900 proceeds to step 912.

At step 912, the server 200 proceeds to the next identified logical node. Once the server 200 has the next logical node, the process 900 proceeds back to step 906 to begin generation and assignment of addresses where possible based on available addresses in the subnets.

Node and Link Generation

Figure 10:
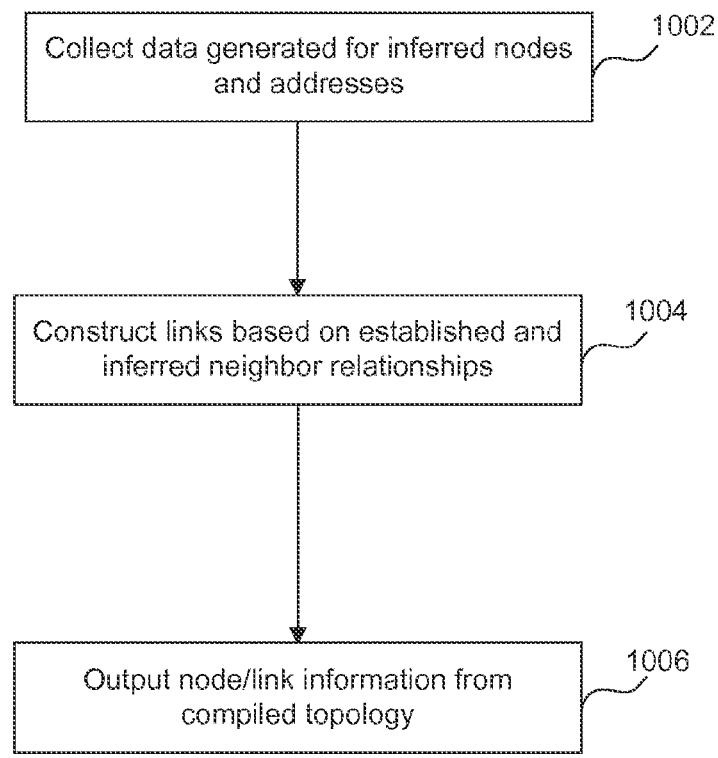
FIG. 10 illustrates an exemplary process for generating node and link information according to an embodiment.

FIG. 10 illustrates an exemplary process 1000 for generating node and link information according to an embodiment. Process 1000 may be an embodiment of step 412 of FIG. 4 and may be performed by the server 200 of FIG. 2, for example by the node and link generator module 218.

At step 1002, the server 200 collects the data generated for the inferred logical nodes and addresses. For example, the node and link generator module 218 may receive the geographic location information determined by the location inference module 210, the port and/or vendor type information inferred by the port/vendor inference module 212, the logical nodes inferred by the multi-stage node inference module 214, and the egress addresses inferred by the address inference module 216. Alternatively, the node and link generator module 218 may receive a subset of the data output from the other modules of server 200 and the data included in the traceroute data.

At step 1004, the server 200 constructs links between the inferred logical nodes based on the established and inferred neighbor relationships of the addresses found in the traceroute data, based on some or all of the data collected at step 1002.

At step 1006, the server 200 outputs the inferred logical node and constructed links. In an embodiment, the output includes the location and vendor of the inferred logical nodes, the names assigned to the inferred logical nodes, the number of known interfaces and their type for the inferred logical nodes, and the number of inferred interfaces. In an embodiment, the output may be in the comma-separated value (CSV) format. As an alternative, the output may be in extensible markup language (XML) format. As will be recognized by those skilled in the relevant art(s), the data may be output in other formats as well.

With the generated node and link information, an effective, detailed topology model may be created by a modeling program for network analysis. Such analysis may include, for example, routing analysis, reachability analysis, and failure analysis to name just a few examples.

Figure 11:
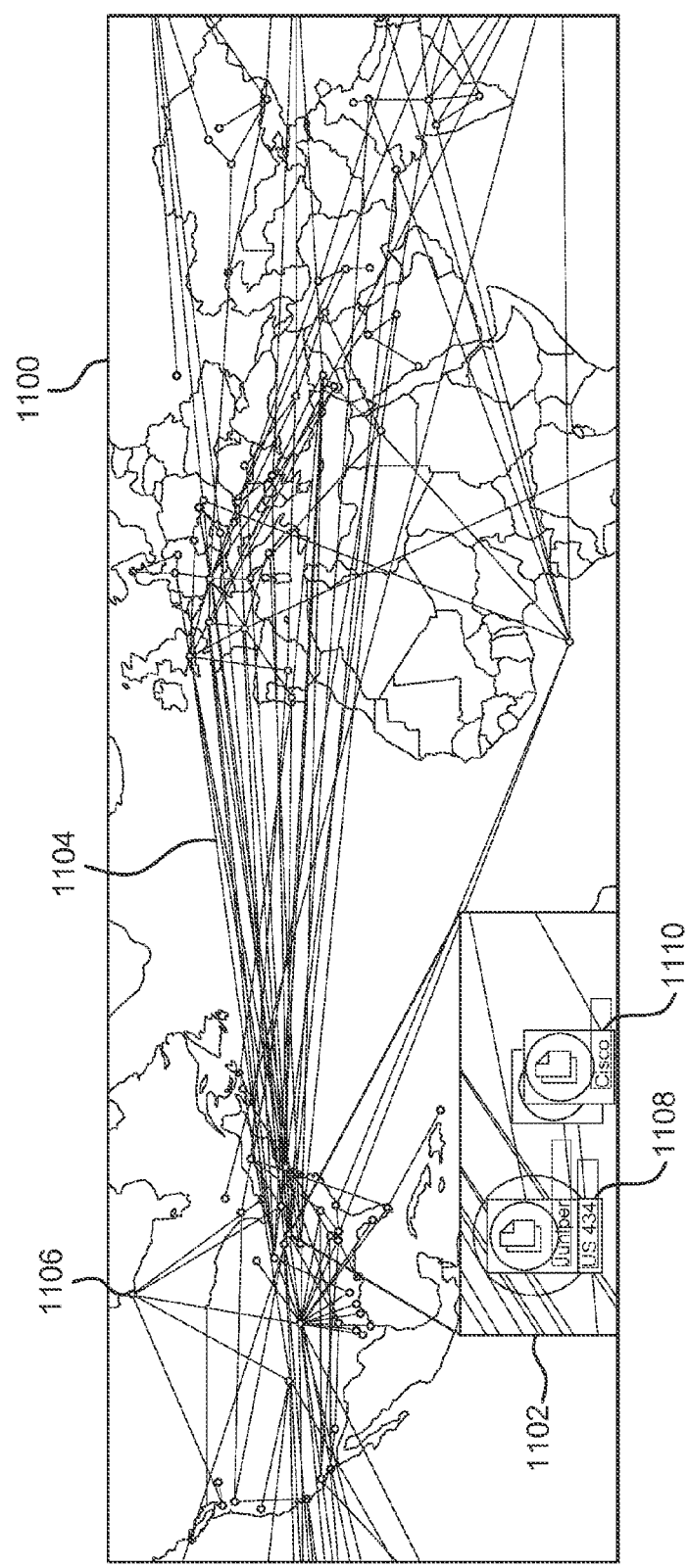
FIG. 11 illustrates an exemplary map generated from node and link information according to an embodiment.

For example, a modeling program may generate a map such as that demonstrated in FIG. 11, which illustrates an exemplary map 1100 generated from node and link information according to an embodiment.

In FIG. 11, the map 1100 includes multiple links 1104, multiple nodes 1104, and detailed information demonstrated by window 1102. The multiple links 1104 are shown in map 1100 as connections between the multiple nodes 1106, such as the logical nodes inferred in process 800 discussed above.

Window 1102 illustrates a closer view at a section of the map 1100, showing two inferred logical nodes 1108 and 1110. Inferred logical node 1108 has been identified as a Juniper router and inferred logical node 1110 as a Cisco router. This identifying information may have been inferred, for example, by the port and/or vendor type inference module 212 performing steps of process 600 discussed above. These are examples only, as will be recognized by those skilled in the relevant art(s).

Embodiments of the present disclosure can be implemented in hardware, software or as a combination of software and hardware. Consequently, embodiments of the disclosure may be implemented in the environment of a computer system or other processing system. An example of such a computer system 1200 is shown in FIG. 12. Embodiments described in FIGS. 1 and 2 may execute on one or more computer systems 1200. Furthermore, each of the steps of the processes depicted in FIGS. 4-10 can be implemented on one or more computer systems 1200.

Example Computer System

Computer system 1200 includes one or more processors, such as processor 1204. Processor 1204 can be a special purpose or a general purpose digital signal processor. Processor 1204 is connected to a communication infrastructure 1202 (for example, a bus or network). Various software implementations are described in terms of this exemplary computer system. After reading this description, it will become apparent to a person skilled in the relevant art(s) how to implement the disclosure using other computer systems and/or computer architectures.

Computer system 1200 also includes a main memory 1206, preferably random access memory (RAM), and may also include a secondary memory 1208. Secondary memory 1208 may include, for example, a hard disk drive 1210 and/or a removable storage drive 1212, representing a floppy disk drive, a magnetic tape drive, an optical disk drive, or the like. Removable storage drive 1212 reads from and/or writes to a removable storage unit 1216 in a well-known manner. Removable storage unit 1216 represents a floppy disk, magnetic tape, optical disk, or the like, which is read by and written to by removable storage drive 1212. As will be appreciated by persons skilled in the relevant art(s), removable storage unit 1216 includes a computer usable storage medium having stored therein computer software and/or data.

In alternative implementations, secondary memory 1208 may include other similar means for allowing computer programs or other instructions to be loaded into computer system 1200. Such means may include, for example, a removable storage unit 1218 and an interface 1214. Examples of such means may include a program cartridge and cartridge interface (such as that found in video game devices), a removable memory chip (such as an EPROM, or PROM) and associated socket, a thumb drive and USB port, and other removable storage units 1218 and interfaces 1214 which allow software and data to be transferred from removable storage unit 1218 to computer system 1200.

Computer system 1200 may also include a communications interface 1220. Communications interface 1220 allows software and data to be transferred between computer system 1200 and external devices. Examples of communications interface 1220 may include a modem, a network interface (such as an Ethernet card), a communications port, a PCMCIA slot and card, etc. Software and data transferred via communications interface 1220 are in the form of signals which may be electronic, electromagnetic, optical, or other signals capable of being received by communications interface 1220. These signals are provided to communications interface 1220 via a communications path 1222. Communications path 1222 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 1216 and 1218 or a hard disk installed in hard disk drive 1210. These computer program products are means for providing software to computer system 1200.

Computer programs (also called computer control logic) are stored in main memory 1206 and/or secondary memory 1208. Computer programs may also be received via communications interface 1220. Such computer programs, when executed, enable the computer system 1200 to implement the present disclosure as discussed herein. In particular, the computer programs, when executed, enable processor 1204 to implement the processes of the present disclosure, such as any of the methods described herein. Accordingly, such computer programs represent controllers of the computer system 1200. Where the disclosure is implemented using software, the software may be stored in a computer program product and loaded into computer system 1200 using removable storage drive 1212, interface 1214, or communications interface 1220.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A method for generating a network topology, comprising:
   receiving traceroute data corresponding to a data packet traversing a path from a source address to a destination address via a plurality of intermediate addresses;
   using the traceroute data to assign a port type to each address in a set of addresses comprising the source address, the destination address and the plurality of intermediate addresses, wherein said using the traceroute data to assign the port type to each address comprises:
   determining a name for the address;
   parsing the name for the address to obtain a parsed name;
   mapping a portion of the parsed name to an entry in a dictionary of port type information; and
   assigning a first port type specified in the entry to the address;
   grouping a subset of the source address, the destination address, and the plurality of intermediate addresses into a logical node based on generated backward neighbors sets and forward neighbors sets, the logical node comprising grouped node information; and
   generating node and link relationships between the source address, the destination address, and the plurality of intermediate addresses based on the assigned port types and the grouped node information.

2. The method of claim 1, further comprising:
   determining geographic locations for the source address, the destination address, and each of the plurality of intermediate addresses; and
   generating the node and link relationships further based on the geographic locations.

3. The method of claim 1, wherein determining the name further comprises:
   performing a reverse domain name system (DNS) lookup for the source address, the destination address, and each of the plurality of intermediate addresses.

4. The method of claim 1, wherein said grouping further comprises:
   grouping addresses in each backward neighbors set as a separate logical node for each of the source address, the destination address, and the plurality of intermediate addresses.

5. The method of claim 4, further comprising:
   checking for a mismatch between node numbers assigned to addresses in one of the backward neighbors sets;
   obtaining a geographic location for a mismatched address in the one of the backward neighbors sets in response to detecting the mismatched address; and
   comparing the obtained geographic location to geographic locations of other backward neighbors sets.

6. The method of claim 5, further comprising:
   assigning the mismatched address a node number associated with another backward neighbors set in response to a match with the other backward neighbors set; and
   assigning the mismatched address a node number associated with a majority of the addresses in the one of the backward neighbors sets in response to no match.

7. The method of claim 1, wherein the source address, the destination address, and the plurality of intermediate addresses represent ingress ports, the method further comprising:
   inferring an egress address for the logical node based on subnet information derived from an address in the forward neighbors sets.

8. A system for generating a network topology, comprising:
   a processor; and
   a non-transitory computer-readable storage medium storing instructions that, when executed by the processor, causes the system to perform a method comprising:
   receiving traceroute data, the traceroute data corresponding to a data packet traversing a path from a source address to a destination address via a plurality of intermediate addresses;
   using the traceroute data to assign a port type to each address in a set of addresses comprising the source address, the destination address and the plurality of intermediate addresses, wherein said using the traceroute data to assign the port type to each address comprises:
    determining a name for the address;
    parsing the name for the address to obtain a parsed name;
    mapping a portion of the parsed name to an entry in a dictionary of port type information; and
    assigning a first port type specified in the entry to the address;
grouping a subset of a source address, a destination address, and a plurality of intermediate addresses from the traceroute data into a logical node based on generated backward neighbors sets and forward neighbors sets; and
generating node and link relationships between the source address, the destination address, and the plurality of intermediate addresses based on the assigned port types and the grouped node information.

9. The system of claim 8, wherein the method performed by the system further comprises:
grouping addresses in each backward neighbors set as a separate logical node for each of the source address, the destination address, and the plurality of intermediate addresses.

10. The system of claim 9, wherein the method performed by the system further comprises:
checking for a mismatch between node numbers assigned to addresses in one of the backward neighbors sets;
obtaining a geographic location for a mismatched address in the one of the backward neighbors sets in response to detecting the mismatched address; and
comparing the obtained geographic location to geographic locations of other backward neighbors sets.

11. The system of claim 10, wherein the method performed by the system further comprises:
assigning the mismatched address a node number associated with another backward neighbors set in response to a match with the other backward neighbors set; and
assigning the mismatched address a node number associated with a majority of the addresses in the one of the backward neighbors sets in response to no match.

12. A method, comprising:
generating, based on traceroute data, a backward neighbors set for each of a source address, a destination address, and a plurality of intermediate addresses, wherein the traceroute data corresponds to a data packet traversing a path from the source address to the destination address via the plurality of intermediate addresses;
grouping addresses in each backward neighbors set as a separate logical node for each of the source address, the destination address, and the plurality of intermediate addresses;
checking for a mismatch between node numbers assigned to addresses in one of the backward neighbors sets;
obtaining a geographic location for a mismatched address in the one of the backward neighbors sets in response to detecting the mismatched address; and
comparing the obtained geographic location to geographic locations of other backward neighbors sets.

13. The method of claim 12, further comprising: assigning the mismatched address a node number associated with another backward neighbors set in response to a match with the other backward neighbors set; and assigning the mismatched address a node number associated with a majority of addresses in the one of the backward neighbors sets in response to no match.

14. The method of claim 12, wherein the source address, the destination address, and the plurality of intermediate addresses represent ingress ports, the method further comprising:
generating, based on the traceroute data, a forward neighbors set for each of the source address, the destination address, and the plurality of intermediate addresses; and
inferring an egress address for the separate logical node based on subnet information derived from an address in the forward neighbors set.

15. The method of claim 12, wherein the logical node comprises grouped node information, the method further comprising:
generating node and link relationships between the source address, the destination address, and the plurality of intermediate addresses based on the grouped node information.

16. A non-transitory computer-readable storage medium having control logic recorded thereon that, when executed by a processor, causes the processor to perform a method for generating a network topology in a server, the method comprising:
generating, based on traceroute data, a backward neighbors set for each of a source address, a destination address, and a plurality of intermediate addresses, wherein the traceroute data corresponds to a data packet traversing a path from the source address to the destination address via the plurality of intermediate addresses;
grouping addresses in each backward neighbors set as a separate logical node for each of the source address, the destination address, and the plurality of intermediate addresses;
checking for a mismatch between node numbers assigned to addresses in one of the backward neighbors sets;
obtaining a geographic location for a mismatched address in the one of the backward neighbors sets in response to detecting the mismatched address; and
comparing the obtained geographic location to geographic locations of other backward neighbors sets.

17. The non-transitory computer-readable storage medium of claim 16, the method further comprising: assigning the mismatched address a node number associated with another backward neighbors set in response to a match with the other backward neighbors set; and assigning the mismatched address a node number associated with a majority of addresses in the one of the backward neighbors sets in response to no match.

18. The non-transitory computer-readable storage medium of claim 16, wherein the source address, the destination address, and the plurality of intermediate addresses represent ingress ports, the method further comprising:
generating, based on the traceroute data, a forward neighbors set for each of the source address, the destination address, and the plurality of intermediate addresses; and
inferring an egress address for the separate logical node based on subnet information derived from an address in the forward neighbors set.

19. The non-transitory computer-readable storage medium of claim 16, wherein the logical node comprises grouped node information, the method further comprising:

generating node and link relationships between the source address, the destination address, and the plurality of intermediate addresses based on the grouped node information.

* * * * *